United States Patent
O'Neill et al.

(10) Patent No.: US 9,577,272 B2
(45) Date of Patent: Feb. 21, 2017

(54) FUEL CELL WITH IMPURITY FILTERING

(71) Applicant: Hamilton Sundstrand Corporation, Charlotte, NC (US)

(72) Inventors: Jonathan Daniel O'Neill, Manchester, CT (US); Benjamin Elmer Bishop, South Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 319 days.

(21) Appl. No.: 14/176,206

(22) Filed: Feb. 10, 2014

(65) Prior Publication Data

US 2015/0079487 A1 Mar. 19, 2015

Related U.S. Application Data

(60) Provisional application No. 61/878,061, filed on Sep. 16, 2013.

(51) Int. Cl.
*H01M 8/04* (2016.01)
*H01M 8/06* (2016.01)

(52) U.S. Cl.
CPC ..... *H01M 8/04097* (2013.01); *H01M 8/0662* (2013.01); *H01M 8/0687* (2013.01); *H01M 2250/20* (2013.01); *Y02E 60/50* (2013.01)

(58) Field of Classification Search
CPC ............. H01M 8/18; H01M 8/22; H01M 8/06
See application file for complete search history.

(56) References Cited

U.S. PATENT DOCUMENTS

| | | | |
|---|---|---|---|
| 7,704,359 B2 | 4/2010 | Sovrano et al. | |
| 7,713,502 B2 | 5/2010 | Koehler et al. | |
| 7,758,990 B2 | 7/2010 | Ha et al. | |
| 8,007,903 B2 | 8/2011 | Okamura et al. | |
| 8,101,307 B2 | 1/2012 | McElroy et al. | |
| 8,124,261 B2 | 2/2012 | Shore | |
| 8,323,415 B2 | 12/2012 | Abd Elhamid et al. | |
| 8,394,552 B2 | 3/2013 | Gummalla et al. | |
| 8,445,114 B2 | 5/2013 | Datta et al. | |
| 2007/0024234 A1* | 2/2007 | Potter | B63G 8/001 320/104 |
| 2009/0023040 A1* | 1/2009 | Paik | H01M 8/04231 429/429 |
| 2011/0165480 A1* | 7/2011 | Rose | H01M 8/04097 429/415 |
| 2012/0000435 A1* | 1/2012 | Scotto | H01M 8/04223 123/3 |
| 2013/0078541 A1 | 3/2013 | Gummalla et al. | |

* cited by examiner

*Primary Examiner* — Stewart Fraser
*Assistant Examiner* — Olatunji Godo
(74) *Attorney, Agent, or Firm* — Carlson, Gaskey & Olds, PC

(57) ABSTRACT

A system has a fuel cell with an anode, a membrane, and a cathode. A source of fuel passes along the anode and a source of an oxygen containing gas passes along the cathode. A downstream line captures fuel downstream of the anode and a separator separates impurities from the fuel on the downstream line, and recirculates fuel downstream of the separator for passage across the anode. A method of mixing air with an oxygen concentrated gas is also disclosed.

12 Claims, 1 Drawing Sheet

FUEL CELL WITH IMPURITY FILTERING

CROSS-REFERENCE TO RELATED APPLICATION

This application claims priority to U.S. Provisional Application 61/878,061, filed Sep. 16, 2013.

BACKGROUND

This application relates to a fuel cell for use in an enclosed environment, wherein impurities are removed from a fuel stream.

Fuel cells are known. One type includes a cathode and an anode separated by a proton-exchange membrane. In one widely used type of such a fuel cell, a fuel source, such as hydrogen ($H_2$), is passed across the anode. Oxygen or an oxygen containing gas is passed across the cathode. The cathode and anode interact such that electricity is generated.

In one application for fuel cells, the fuel sources are contained and sustainable for a long period of time. As an example, in underwater vehicles and, in particular, unmanned underwater vehicles, the fuel cell must be operable to provide power for lengths of time. Thus, a source of hydrogen and a source of oxygen or a gas containing oxygen are provided on the vehicle.

Fuel, such as hydrogen or hydrogen mixed with other gases, is recycled after having passed across the anode and is therefore not used with 100 per cent efficiency. Thus, downstream of the anode, the unused hydrogen or fuel gas is captured and sent for passage back across the anode to improve overall system efficiency.

However, the fuel stream or hydrogen may contain impurities and the percentage of impurities may build up on the anode as the hydrogen or fuel gas is consumed. Further, the oxygen supply may also contain significant non-reactant gas as an impurity. Any non-reactant gases such as nitrogen or other diluent on the cathode would exacerbate the problem on the anode, since the nitrogen or other diluent will pass through or "cross-over" the proton-exchange membrane and become entrained in the fuel. Over time, the amount of nitrogen or other impurities within the fuel would increase and this would prove problematic.

If a fuel cell initially developed for use in an air environment is also used in underwater vehicles, it may be desirable to supply air or dilute oxygen to the cathode rather than concentrated or pure oxygen. This presents two problems in addition to the aforementioned issue of non-reactant gas cross-over into the fuel stream. First, the storage volume required for air or dilute oxygen will be much greater than for concentrated or pure oxygen.

Second, as circumstances may prohibit the venting of diluents such as nitrogen from the cathode exhaust, additional storage volume may be required for the diluents in the cathode exhaust. On the other hand, if the cathode exhaust is simply recycled and mixed with the incoming air or to dilute oxygen, or if the impurities in the source oxygen build in concentration, the cathode performance will quickly plummet as the oxygen is diluted even further.

SUMMARY

A system has a fuel cell with an anode, a membrane, and a cathode. A source of fuel passes along the anode and a source of oxygen or an oxygen containing gas passes along the cathode. A downstream line captures fuel outflow downstream of the anode and a separator separates impurities from the fuel on the downstream line, and recirculates fuel downstream of the separator for reintroduction in the fuel stream across the anode. A method of mixing air with an oxygen concentrated gas is also disclosed.

These and other features may be best understood from the following drawings and specification.

DETAILED DESCRIPTION

Figure 1:
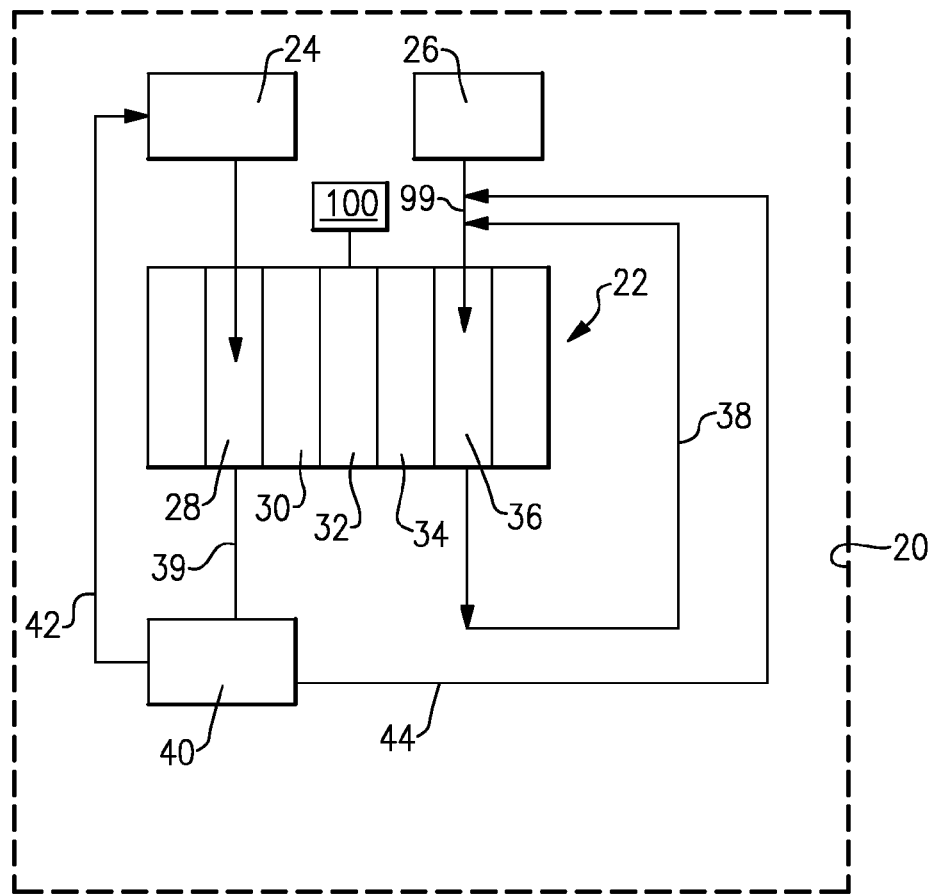
FIG. 1 schematically shows a recycling system for use on a vehicle containing a fuel cell.

A vehicle 20 includes a fuel cell 22. In practice, there could be a plurality of fuel cells providing power for various components on the vehicle 20. As shown schematically, a device 100 is powered by electricity generated by the fuel cell 22.

In embodiments, the vehicle 20 may be an underwater vehicle and, in particular, may be an unmanned underwater vehicle. In such vehicles, the fuel cell 22 must be operable for lengths of time. Thus, a fuel tank 24 is provided with a stored volume of fuel.

A second tank 26 is provided with oxygen or a gas containing oxygen, such as air. For purposes of this application, the term "oxygen containing gas" would extend to all such gases.

An anode 30, a cathode 34 and an intermediate proton-exchange membrane 32 are provided in the fuel cell 22.

The vehicle 20 must be operable for a length of time and, thus, unused fuel leaving anode 30 and the unused oxygen leaving cathode 34 must be recycled and reutilized. In many applications, for the vehicle to be "invisible" to potential observers, there must be no waste gas delivered outwardly of the vehicle.

As shown in FIG. 1, the fuel which may be hydrogen from tank 24 passes along anode 30 through passages 28 at which it interacts with the anode 30. Some of the fuel will remain unreacted when it has passed downstream of the anode 30 and reached a downstream line 39. This fuel is recycled through line 42 back to the tank 24. Alternatively, the hydrogen or fuel may be recycled to a location, such as a location downstream of the tank 24 and directly back into the passages 28. In either way, to efficiently utilize the volume of fuel in the tank 24, the unused fuel is recycled.

Similarly, an oxygen containing gas from tank 26 passes along cathode 34 through passages 36 and is recycled through line 38 back to line 99 leading back to cathode 36. The oxygen containing gas in tank 26 could be pure oxygen, but in many applications, for practical reasons, it may contain air or may contain other impurities which are non-reactants.

As mentioned above, air contains a relatively high volume of nitrogen or other impurities (non-reactants). During the interaction in the fuel cell 22, some percentage of the air or other impurities will diffuse or otherwise pass through the membrane 32 into the fuel stream on the anode side 28.

A separator 40 is provided on the downstream line 39 and intermediate to the lines 39 and 42. The separator 40 separates an impurity flow 44, such as nitrogen, from the fuel stream to be recycled.

By separating the nitrogen or other non-reactants at 40 from the fuel outflow of the fuel cell, the purity of the fuel returned through the line 42 is ensured. Further, by delivering the separated nitrogen or other impurities through line 44 back to the cathode feed line 99 between tank 26 and passages 36, proper oxygen to diluent concentrations may be maintained. In this manner, the overall operation of the fuel cell 22 will be closer to optimal.

In one embodiment, the separator 40 may be a palladium (Pd) membrane, which is known for separating nitrogen and hydrogen.

Figure 2:
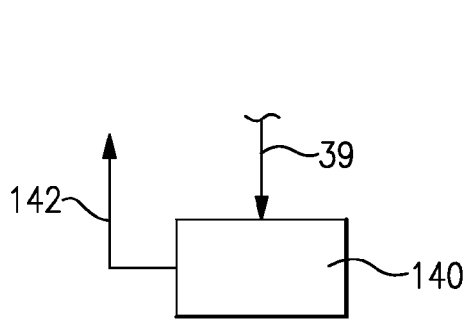
FIG. 2 shows a second embodiment.

As shown in FIG. 2, the nitrogen need not be recycled. In FIG. 2, the downstream line 39 passes into a separator 140 which simply separates the nitrogen out and returns hydrogen to a fuel line 142 which is closer to pure hydrogen.

The separator 140 may be zeolite or a silica gel which are known elements for removing nitrogen from a hydrogen flow. Other non-reactants may be separated in a similar manner.

With the overall combination and the method of separating nitrogen, the fuel recycled through the line 42 is closer to pure, mitigates the risk of corrosion locally within fuel cell 22 due to fuel dilution. In this manner, the vehicle 20 is able to operate for a longer period of time and more efficiently. Further, potential damage to the fuel cell membrane is also averted, extending the useful life of the cell stack.

Figure 3:
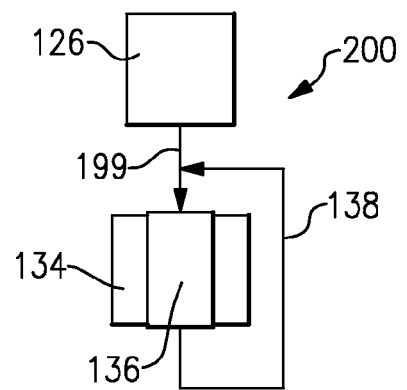
FIG. 3 shows another feature.

In some embodiments, fuel cell 22 is designed for use with air or dilute oxygen rather than pure or concentrated oxygen, but tank 26 may contain pure or concentrated oxygen. FIG. 3 illustrates such an example 200. One or more of channels 136, recycle line 138, and perhaps other volumes in fluid communication with cathode 134 (such as passage 199) may be initially filled with air or an inert gas such as nitrogen. As oxygen enters channels 136 from tank 126, it mixes with the air or inert gas before being consumed at cathode 134. Nitrogen or other inert gases and any unconsumed oxygen in the cathode exhaust are recycled through line 138 for dilution of incoming oxygen from 126. This strategy reduces the storage volume from the large volume required for air to the smaller volume required for oxygen. It also allows the cathode exhaust to be recycled instead of stored, but does not cause decreases in performance below that required of air cathodes.

In a method, a fuel is passed across an anode of a fuel cell. Oxygen is stored in an oxygen containing gas container 126 having a higher concentration of oxygen than does air. The oxygen containing gas is passed across a cathode 136 of the fuel cell. Air or another inert gas is initially deposited into a volume in fluid communication with the cathode such that the air or other inert gas mixes with the oxygen containing gas as the oxygen containing gas passes across the cathode.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A system comprising:
a fuel cell having an anode, a membrane, and a cathode;
a source of fuel for passing along said anode and a source of an oxygen containing gas for passing along said cathode;
a downstream line for capturing fuel downstream of the anode and a separator for separating impurities from the fuel on the downstream line, and recirculating fuel downstream of said separator for passage across the anode;
wherein a cathode exhaust line is recycled to a cathode feed line to dilute an incoming oxygen containing gas; and
wherein the source of oxygen containing gas has a higher concentration of oxygen than air, and a volume in fluid communication with the cathode is initially filled with air, or inert gas.

2. The system as set forth in claim 1, wherein said separated fuel is returned to a tank for storing the fuel.

3. The system as set forth in claim 1, wherein said removed impurities include nitrogen.

4. The system as set forth in claim 3, wherein said removed nitrogen is returned to a cathode feed line.

5. The system as set forth in claim 1, wherein said separator includes a palladium membrane or other separator for separating nitrogen or other impurities from the fuel and wherein the fuel is hydrogen ($H_2$).

6. The system as set forth in claim 1, wherein said separator absorbs impurities from a fuel flow.

7. The system as set forth in claim 6, wherein said separator includes at least one of a silica gel and zeolite.

8. The system as set forth in claim 1, wherein said system is part of an underwater vehicle.

9. A method of operating a fuel cell on an enclosed vehicle comprising the steps of:
a) passing a fuel across an anode of a fuel cell;
b) passing an oxygen containing gas from a source across a cathode of the fuel cell, capturing fuel downstream of the anode and removing impurities from the fuel, and returning the fuel for passage across the anode; and
c) capturing a cathode exhaust line to be recycled to a cathode feed line to dilute an incoming oxygen containing gas, and the source of oxygen containing gas being stored with a higher concentration of oxygen then found in air, and a volume in fluid communication with the cathode is initially filled with air, or an inert gas.

10. The method as set forth in claim 9, wherein said removed impurities are returned to the cathode feed line.

11. The system as set forth in claim 1, wherein the system is part of an underwater vehicle.

12. The method as set forth in claim 9, wherein the steps occur on an underwater vehicle.

* * * * *